United States Patent [19]
Schulz et al.

[11] Patent Number: 5,275,036
[45] Date of Patent: Jan. 4, 1994

[54] RELIEF VALVE TESTING APPARATUS

[75] Inventors: Siegfried Schulz, South Barrington; Josef J. Schmidt, Woodstock; Patrick K. Brennan, McHenry, all of Ill.; Scott A. Ton, Porter, Ind.

[73] Assignee: Continental Field Machining Co., Inc., Schaumburg, Ill.

[21] Appl. No.: 723,609

[22] Filed: Jul. 1, 1991

[51] Int. Cl.⁵ .................. G01L 27/00; G01L 5/22; G01L 5/00
[52] U.S. Cl. .................. 73/4 R; 73/168; 73/862.541
[58] Field of Search ........ 73/4 R; 73/168; 73/862.56; 73/862.541; 73/831; 73/833

[56] References Cited

U.S. PATENT DOCUMENTS

| | | | |
|---|---|---|---|
| 2,317,826 | 4/1943 | Templin | 73/833 X |
| 2,350,577 | 6/1944 | Vordahl | 73/833 X |
| 2,419,293 | 4/1947 | Simonson | 73/4 R |
| 3,309,918 | 3/1967 | Scott et al. | 73/833 |
| 4,349,885 | 9/1982 | Thompson | 73/4 R X |
| 4,428,223 | 1/1984 | Trevisan | 73/168 X |
| 4,568,310 | 1/1986 | Cohen et al. | 73/9 |
| 4,572,237 | 2/1986 | Thompson | 251/61 X |
| 4,646,556 | 3/1987 | Courcoux et al. | 73/4 R |
| 4,761,999 | 8/1988 | Thompson | 73/4 R X |
| 4,949,288 | 8/1990 | Bookout | 73/4 R X |

FOREIGN PATENT DOCUMENTS 103436  4/1990  Japan .................. 73/168

Primary Examiner—Tom Noland
Attorney, Agent, or Firm—Kinzer, Plyer, Dorn, McEachran & Jambor

[57] ABSTRACT

An apparatus for testing the opening pressure of a relief valve has a clamp removably secured to the bonnet of a relief valve. The clamp has four upstanding bolts slidably held in T-shaped slots. The bolts mount the base plate of a frame which carries a lifting cylinder and transducer. The cylinder connects to the relief valve stem and applies a lifting force thereto. The transducer measures the amount of force needed to open the valve. The frame is removable from the clamp which provides access to the relief valve adjustment nut. Adjustments in the relief valve opening pressure can be made without requiring removal of the clamp. A calibration adaptor fits on the frame to allow testing of the transducer in situ.

12 Claims, 3 Drawing Sheets

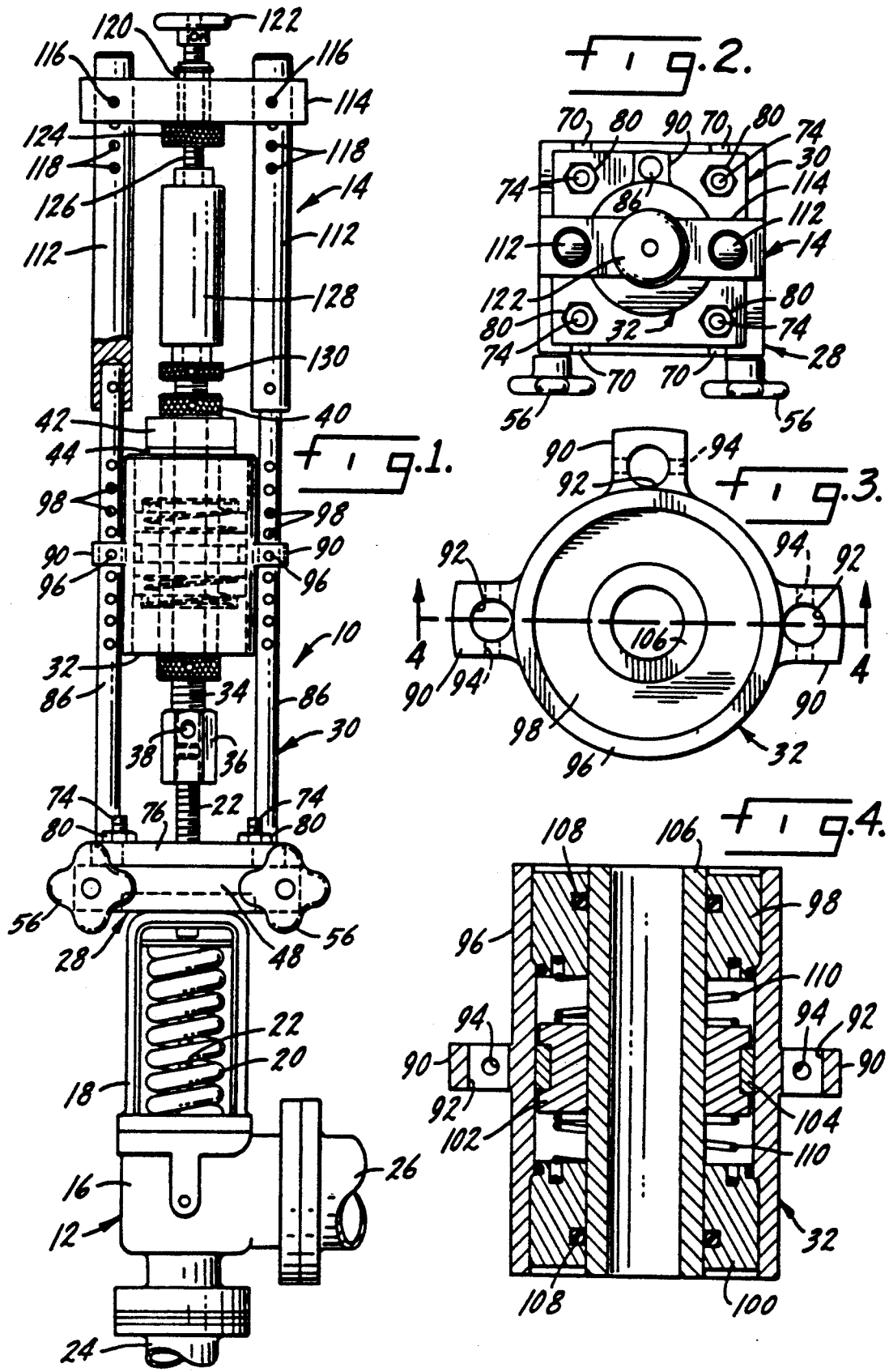

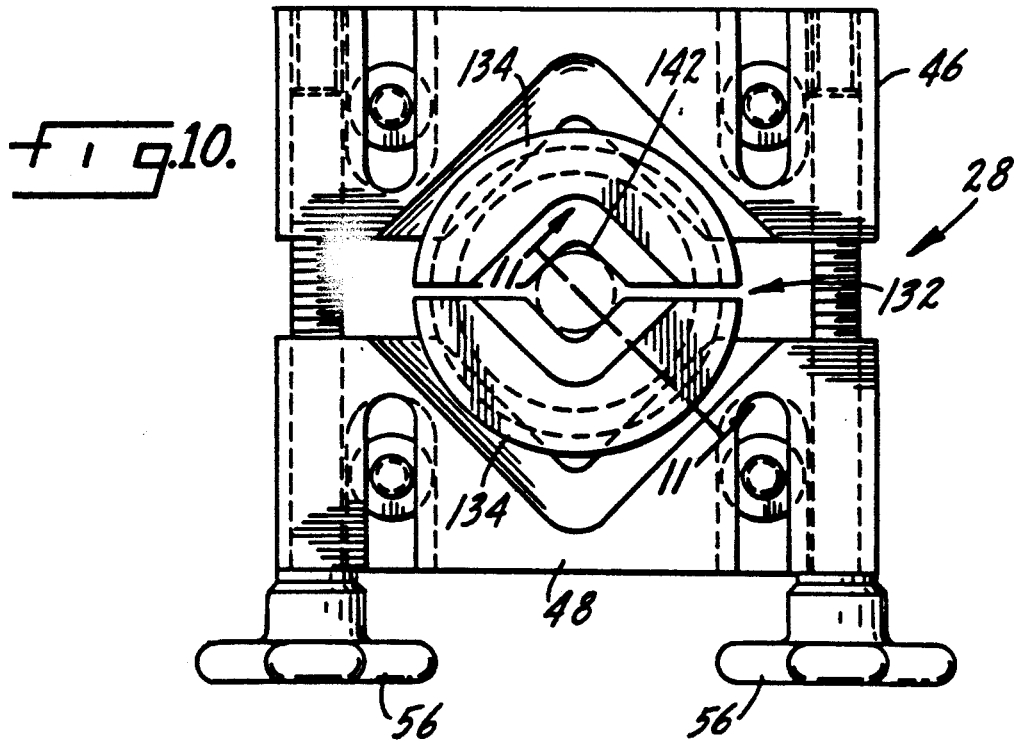
Fig. 10.
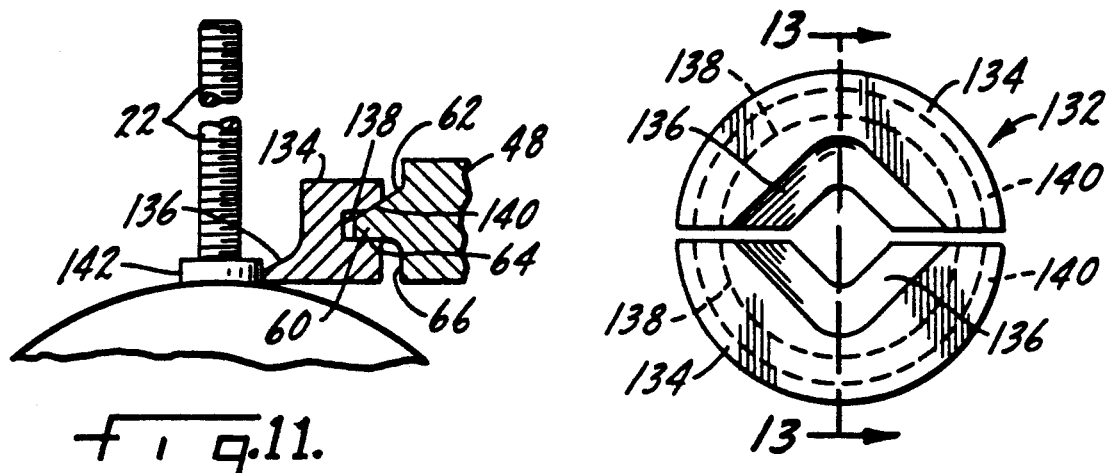
Fig. 11.
Fig. 12.
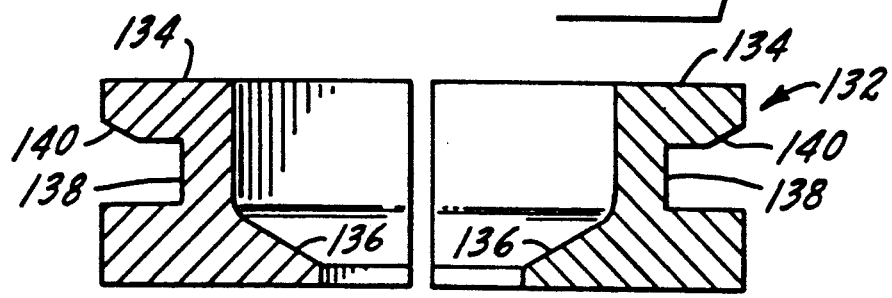
Fig. 13.

RELIEF VALVE TESTING APPARATUS

BACKGROUND OF THE INVENTION

This invention relates to apparatus for testing the operation of relief valves, sometimes also called safety valves. Such valves are mounted on pressurized vessels, pipes, tanks and similar apparatus. The valves are designed to protect the pressurized apparatus by opening at a predetermined point above normal operating pressure. The pressure at which the valve opens is called the set point. Under ordinary conditions relief valves remain closed and are not actuated. As a result the set pressure may change over time. Sound management principles dictate that relief valves be checked periodically to assure proper operation of the valves, namely, that the set pressure remains at the designed value.

The present invention concerns testing apparatus intended for checking relief valves without removing them from the pressurized apparatus. Examples of known testing apparatus of this type are shown in the following U.S. patents: Trevisan U.S. Pat. No. 4,428,223, Thompson U.S. Pat. No. 4,349,885 and Thompson U.S. Pat. No. 4,761,999. These and other prior art devices, while able to produce the desired set pressure testing, suffer from being awkward and unwieldy to use. In particular they are difficult to set up on a valve and they do not provide a ready means for calibrating their transducers.

To perform a test the apparatus is mounted on the valve, which, depending on the valve construction, may require removal of a cap and handle. The test apparatus has a clamp to grab the valve bonnet, with a lifting cylinder and transducer disposed on the clamp. The lifting cylinder applies an opening force to the valve which force is measured by the transducer. Together with knowledge of the pressure in the apparatus and the valve seat dimension, the set pressure can be determined from the force measurement.

Since the test apparatus must accommodate valves ranging in size from a half inch to eight inches, the clamp has to be adjustable. This is typically accomplished by splitting the clamp into two halves which are movable toward and away from each other as needed.

The required adjustability of the clamp complicates mounting of the lifting cylinder on the clamp because a rigid structure cannot be used; a rigid support would defeat adjustability. One way around this is to mount to only one half of the clamp. The resulting structure is flimsy and difficult to use because a test may require several successive mounting and unmountings of the test device.

Regarding this last point, consider how the usual valve test is performed. If the set pressure of the valve is not at the desired point, the test apparatus must be removed to permit access to the valve's adjustment nut. The nut is moved as required to adjust the set pressure to the design point. Then the test apparatus is remounted to check the new set point. This checking and adjusting process continues until the design set point is reached.

Another factor in the ease of use of a testing apparatus is the ability to check the accuracy of the transducer. Prior art devices require removal of the apparatus from the valve and putting it on a special fixture to calibrate the transducer.

SUMMARY OF THE INVENTION

The present invention relates to relief valve testing apparatus. A primary object of the invention is a testing apparatus which increases testing productivity by virtue of being easier to mount and unmount.

Another object of the invention is a testing apparatus which can be calibrated while in use on a valve.

These and other objects which may become apparent from time to time in the following description and drawings are realized by a testing apparatus having a clamp member which is removably engageable with the valve. When the clamp is mounted on the valve there is still access to the adjustment nut of the valve.

The test apparatus further includes a frame including a base plate and three upstanding posts fixed to the plate. The base plate is releasably mounted on the clamp. A lifting cylinder is supported on the posts and is connectable to the valve stem. A transducer is operatively engageable with the cylinder to measure the force applied by the cylinder to the stem. The frame can be removed from the clamp without need for releasing the clamp from the valve.

A calibration adaptor supports a ring gauge for checking the transducer. The adaptor has a pair of rods which fit down over the upper ends of the posts. These rods support a bracket which spans the two rods. The bracket mounts the ring gauge. With this adaptor the transducer can be checked while the testing apparatus is on a valve.

BRIEF DESCRIPTION OF THE DRAWINGS

FIG. 1 is a side elevation view of the relief valve testing apparatus of the present invention, with the calibration adaptor mounted on top of the apparatus.

FIG. 2 is a plan view of the apparatus and adaptor.

FIG. 3 is a plan view of the lifting cylinder.

FIG. 4 is a side sectional view of the lifting cylinder taken along line 4—4 of FIG. 3.

FIG. 10 is a view similar to FIG. 6 with the addition of a clamp insert.

FIG. 11 is section taken along line 11—11 of FIG. 10.

FIG. 12 is a plan view of the insert.

FIG. 13 is an enlarged section taken along line 13—13 of FIG. 12.

DETAILED DESCRIPTION OF THE INVENTION

Figure 5:
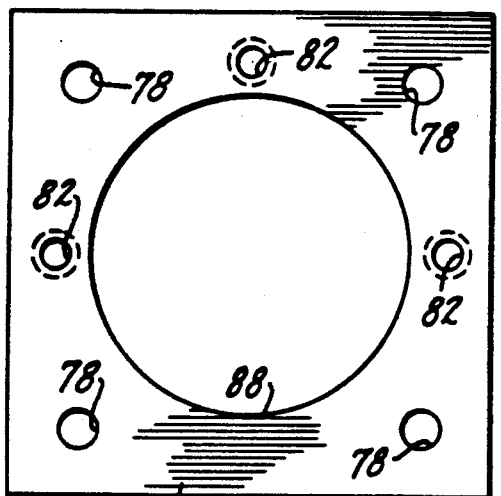
FIG. 5 is a plan view of the base plate.

FIG. 1 shows the relief valve testing apparatus 10 of the present invention mounted on a relief valve 12. A calibration adaptor is shown mounted on the testing apparatus at 14. The relief valve 12 has a housing 16 which includes a U-shaped bonnet 18. The bonnet partially encloses a spring 20 which biases a valve stem 22. While not shown, it will be understood that inside the housing 16 the valve stem is connected to a piston which engages a valve seat. The piston and seat are exposed to the process pressure of whatever apparatus the valve is connected to through line 24. A collection line 26 may be connected to the valve for containing any process fluid released through the valve, either during testing or in the case of an overpressure event.

The testing apparatus 10 includes a clamp shown generally at 28 and a frame shown generally at 30. The frame supports a lifting cylinder 32. The lifting cylinder has an open center or core through which a threaded connecting rod 34 extends. The connecting rod has a coupling nut 36 at its lower end fastened thereto by a pin 38. The coupling nut engages the valve stem 22. The upper end of the connecting rod 34 has a knurled locking nut 40. A transducer 42 is trapped between the locking nut 42 and a transfer plate 44. The transfer plate rests on top of the lifting cylinder 32. Details of the operation of the lifting cylinder will be described below.

Turning now to FIGS. 6-9, details of the clamp 28 are shown. The clamp has two movable jaws 46 and 48. Jaw 46 has threaded openings 50 aligned with unthreaded openings 52 in jaw 48. A pair of threaded clamping rods 54 extend through openings 52 and engage the threads of openings 50. Knobs 56 connect to rods 54 to allow for ease of tightening of the clamp jaws by rotating the rods 54.

Figure 7:
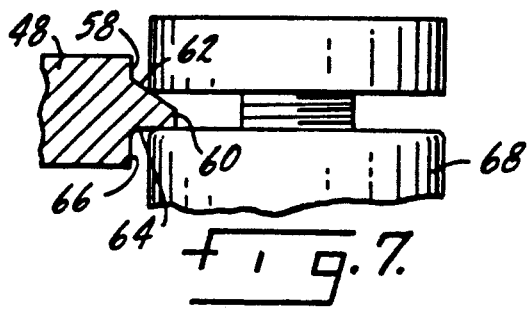
FIG. 7 is a section taken along line 7—7 of FIG. 6.
Figure 8:
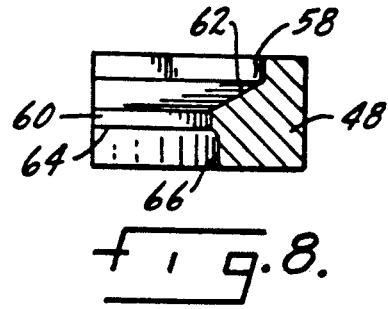
FIG. 8 is a section taken along line 8—8 of FIG. 6.

Each jaw 46, 48 has a gripping surface formed on one edge thereof. The gripping surfaces are in facing relation and each define a generally V-shaped depression shown at 58. A lip 60 extends from each depression 58. The lip has a beveled upper surface 62 and a generally flat or horizontal lower surface 64 (FIG. 7). The underside of the lip defines a cut out portion 66 of each jaw. The cutout receives a boss 68 (FIG. 7) formed on the valve bonnet 18. The jaws 48 and 46 grippingly engage the boss 68 to hold the clamp fixed thereto. This results from tightening the rods 54.

The clamp 28 includes an attachment means for securing the frame 30 thereto. The attachment means in this embodiment comprises four T-shaped slots formed in the upper surface of each jaw and extending to an edge thereof. The slots are shown at 70. Each slot has a bolt slidably entrapped therein. Each bolt has a head 72 disposed in the wide portion of the slot 70. The bolts also have a shank 74 which extends upwardly through the narrow portion of the T-shaped slots 70. The sliding engagement of the bolts in the slots permit the bolts to mount the frame regardless of the spacing between the clamp jaws 46, 48.

Figure 9:
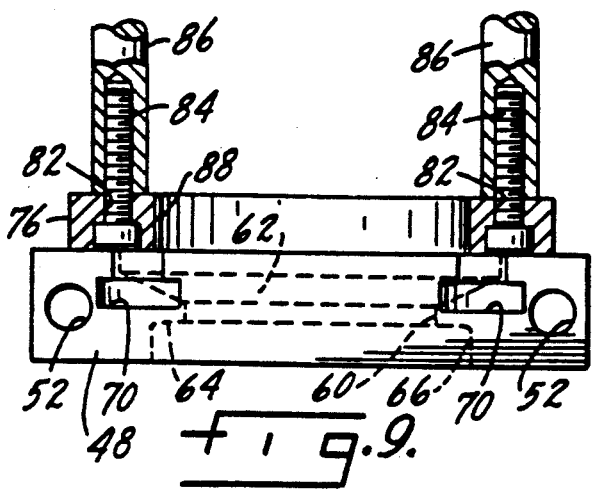
FIG. 9 is a side elevation view of the clamp and base plate, with portions shown in section.
Figure 6:
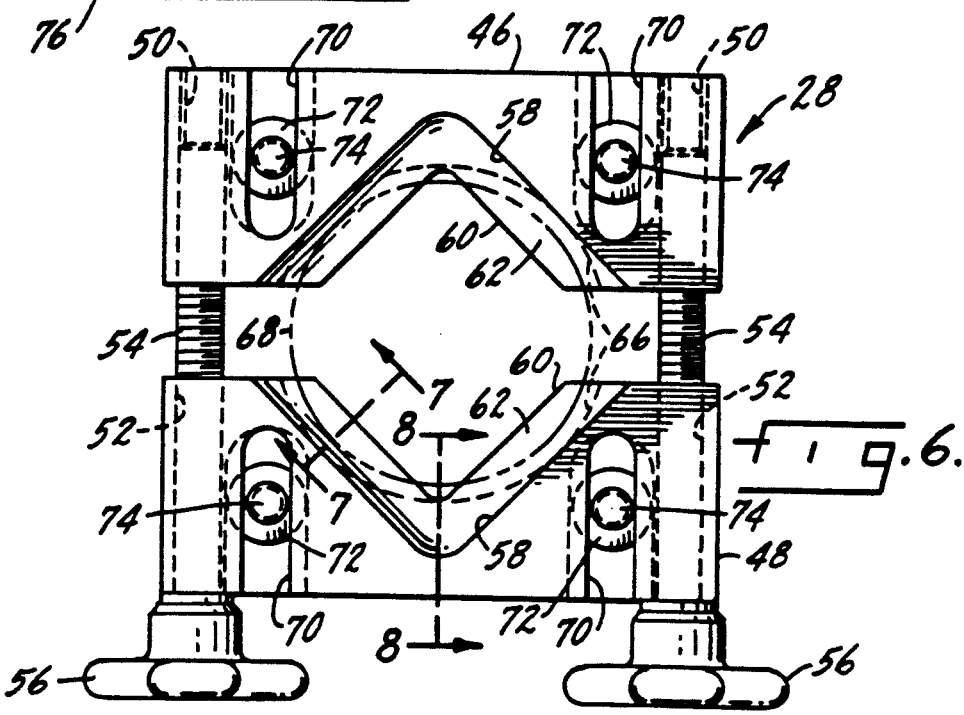
FIG. 6 is a plan view of the clamp.

Details of the frame are shown in FIGS. 5 and 9. The frame includes a base plate 76 which has four holes 78 for receiving the bolt shanks 74. When the frame is placed on the clamp, the bolts are adjusted in their slots to align with the openings 78. Nuts 80 (FIG. 2) are used to secure the base plate to the clamp.

The base plate also has three counterbored openings 82 with bolts 84 extending through them and into the bottom of three upstanding posts 86. The posts support the lifting cylinder in a manner which will be described below. A central opening 88 in the base plate 76 allows passage of the valve stem and provides access to the clamp.

Now looking at FIGS. 3 and 4, details of the lifting cylinder 32 are shown. The cylinder has three lugs 90 welded to its external wall. Each lug has an opening 92 which receives a post 86. Cross holes 94 receive pins 96 (FIG. 1) which align with openings 98 in the posts 86 to secure the lugs to the post.

The lifting cylinder has an external cylinder 96 whose ends are closed by upper and lower end caps 98 and 100. In the space between the end caps is a piston 102 carrying a seal 104. The piston is fixed to a piston sleeve 106. The sleeve is sealed to the end caps by seals 108. It will be understood that the connecting rod 34 extends through the center of the piston sleeve 106. Springs 110 seated in annular grooves in the end caps may be used to center the piston within cylinder 96. It will be understood that pressure fluid connections will also be included, although these are not shown. The connections would be to the chambers both above and below the piston The calibration adaptor 14 shown in FIGS. 1 and 2 includes two upstanding rods 112 which have fittings at their lower ends for engaging the upper ends of the posts 86. In the illustrated embodiment, the fittings simply comprises bores at the bottom of the rods with transverse holes for receiving retaining pins. A gauge support bracket 114 spans the two rods 112. The bracket has openings which receive the rods. Transverse pin holes 116 in the bracket align with similar holes 118 in the rods to receive retaining pins which adjustably mount the bracket on the top of the rods. A gauge-locking sleeve 120 fits through an opening in the center of the bracket 114 . The sleeve includes a knob 122 on the top and a locking nut 124 underneath which position a rod 126. The rod 126 locates a ring gauge 128 which is connected to the rod 34 by a nut 130.

FIGS. 10-13 illustrate an insert 132. The insert comprises two identical, semi-circular elements. Each element has a wall 134 which on the front side curves to define a ledge 136. A slot 138 is defined in the other side of the wall. The slot includes an inclined face 140. The slot receives the lip 60 of the clamp jaws with beveled surface 62 mating with inclined surface 140, as best seen in FIG. 11. The ledges 136 engage the boss 142 (FIG. 11). With the use of the insert 132, smaller valves can be tested using the clamp 28.

The use, operation and function of the invention are as follows. If a valve is equipped with a cap and handle, these parts are removed before mounting the clamp 28 on the valve. The clamp is mounted by first opening the jaws 46, 48 sufficiently to allow them to fit over the valve boss. Then the knobs 56 are rotated to turn the threaded rods 54 to pull the clamp jaws together, thereby tightly engaging the boss of the valve. This may be done with or without the insert 132, depending on the size of the valve.

After the clamp is secured to the valve, the frame 30 is placed on the clamp. This is done by locating the bolts 74 of the clamp in the slots 70 such that they align with the openings 78 in the base plate 76. With the bolt shanks 74 extending through the base plate, the nuts 80 secure the base plate to the clamp. With the frame in place, the height of the lifting cylinder 32 is adjusted as required on the posts 86. Then the coupling nut 36 is attached to the valve stem 22 and locking pin 38 is placed through the nut 36. Locking nut 40 is then tightened down on the transducer 42 to complete the mechanical linkage. The transducer is connected to an appropriate recording device such as a Soltec TA 200-938. If there is an available port, this recorder can also be connected to a line pressure gauge. Otherwise, some reading of the local pressure in the line must be obtained, as in the past. The final connection is of the hydraulic lines to the cylinder 32.

It will be understood that the invention requires use of a hydraulic package including a fluid supply and pump with appropriate controls and regulators.

Once everything is connected, the test begins by supplying hydraulic fluid to the underside of the piston 102, which then moves upwardly carrying the piston sleeve 106 with it. This in turn raises the plate 44 against the transducer 42, compressing it against the locking nut 40. The upward pressure on the locking nut carries the connecting rod 34 and valve stem 32 upwardly. The recorder unit records the force on the transducer which, together with the line pressure, indicates the set pressure of the valve.

If the measured set pressure is not at the design criterion, the connecting nut 36 is disconnected from the valve stem 22 and the frame, including base plate 76, is removed from the clamp 28. The arrangement of the clamping jaws is such that the adjusting nut of the valve is accessible without removing the clamp. The adjusting nut is moved as appropriate, based on the measured set pressure, and then the frame 30 is remounted on the clamp and the connecting rod is connected again to the valve stem and the test is run again. This procedure continues until the measured set pressure is in the desired range.

If it is desired to check the accuracy of the transducer 44, the calibration adaptor 14 is placed on top of two of the posts 86, as illustrated in FIG. 1. The ring gauge 128 is mounted between the top of the rod 34 and the gauge support bracket 114, using the adjustment features provided by nuts 124 and 130. Thus, the ring gauge 128 is placed in compression between nut 130 and rod 126. The ring gauge then sees the same compression as the transducer 42. Calibration of the transducer can then be checked.

It can be seen that the testing unit of the present invention increases testing productivity by virtue of several features. First, the separate clamp is relatively easy and fast to set up on the valve. The frame is a rigid structure having three posts supporting the lifting cylinder, making the frame relatively easy to handle both on and off the valve. The frame quickly attaches to the installed clamp and just as easily can be taken off for access to the valve's adjusting nut. Calibration can be done with the unit on a valve by adding the calibration adaptor to the regular testing unit.

Whereas a preferred form of the invention has been shown and described, it will be realized that alterations may be made thereto without departing from the scope of the following claims.

We claim:

1. Apparatus for testing relief valves of the type having a housing, a seat defined in the housing, a piston normally closing the seat, a valve stem connected to the piston and extending out of the housing, a spring biasing the stem and piston against the seat, and adjusting means for selecting the biasing force of the spring, the apparatus comprising:
   a clamp removably engageable with the housing of the relief valve being tested, the clamp providing access to the adjusting means of the relief valve when the clamp is mounted on the valve;
   a frame including a base plate;
   attachment means for releasably mounting the base plate on the clamp, the clamp and frame being arranged such that the clamp can remain mounted on the valve when the frame is removed from the clamp;
   lifting means supported on the frame and connectable to the valve stem for applying an opening force to the relief valve being tested; and
   a transducer for measuring the opening force applied by the lifting means.

2. The apparatus of claim 1 wherein the clamp comprises two jaws each having a valve gripping surface formed on one edge thereof, the valve gripping surfaces being in facing relation.

3. The apparatus of claim 2 wherein the jaws are movable toward and away from one another by at least one clamping rod extending through an opening in one jaw and threadedly engaging an opening in the other jaw.

4. The apparatus of claim 2 wherein the gripping surface defines a V-shaped depression in the edge of the jaw.

5. The apparatus of claim 4 wherein the gripping surface further comprises a lip extending from the V-shaped depression, the lip having a beveled upper surface and a generally flat lower surface.

6. The apparatus of claim 1 wherein the attachment means adjustably fixes the base plate position relative to the clamp.

7. The apparatus of claim 6 wherein the attachment means comprises at least one T-shaped slot in the clamp, a bolt with a head thereof slidably disposed in the slot and a shank of the bolt extending upwardly out of the slot, a hole defined in the base plate for each slot, the hole receiving the upstanding bolt shank, and a nut threadedly engaging the bolt on top of the base plate.

8. In a relief valve testing apparatus of the type having lifting means supported on a frame and connectable to the relief valve for applying an opening force thereto and a transducer for measuring the opening force applied by the lifting means, an improved means for mounting the testing apparatus on the relief valve, comprising a clamp removably engageable with the relief valve being tested, a base plate included in said frame, and attachment means for releasably mounting the base plate on the clamp such that the base plate can be mounted on and removed from the clamp without removing the clamp from the relief valve.

9. The apparatus of claim 8 wherein the attachment means adjustably fixes the base plate position relative to the clamp.

10. The apparatus of claim 8 wherein the frame includes at least three upstanding posts mounted on the base plate in spaced relation, the lifting means being connected to the posts.

11. The apparatus of claim 10 wherein the attachment means comprises at least one T-shaped slot in the clamp, a bolt with a head thereof slidably disposed in the slot and a shank of the bolt extending upwardly out of the slot, a hole defined in the base plate for each slot, the hole receiving the upstanding bolt shank, and a nut threadedly engaging the bolt on top of the base plate.

12. A method of operating a relief valve testing apparatus of the type having lifting means supported on a frame and connectable to the relief valve for applying an opening force thereto, a base plate supporting the frame, and a transducer for measuring the opening force applied by the lifting means, comprising the steps of:
   a) attaching a clamp to the relief valve being tested;
   b) releasably securing the base plate to the clamp;
   c) connecting the lifting means to a stem of the relief valve;
   d) activating the lifting means and reading the transducer to determine the opening pressure of the relief valve;
   e) adjusting the opening pressure of the relief valve, if necessary, by disconnecting the lifting means from the valve stem, releasing the base plate from the clamp while leaving the clamp attached to the relief valve, and resetting adjustment means of the relief valve as required; and
   f) repeating steps (b)-(e) as required until the desired opening pressure is obtained.

* * * * *